April 2, 1946.  G. E. STEWART  2,397,516
SAFETY LOCKING DEVICE
Filed Aug. 5, 1944
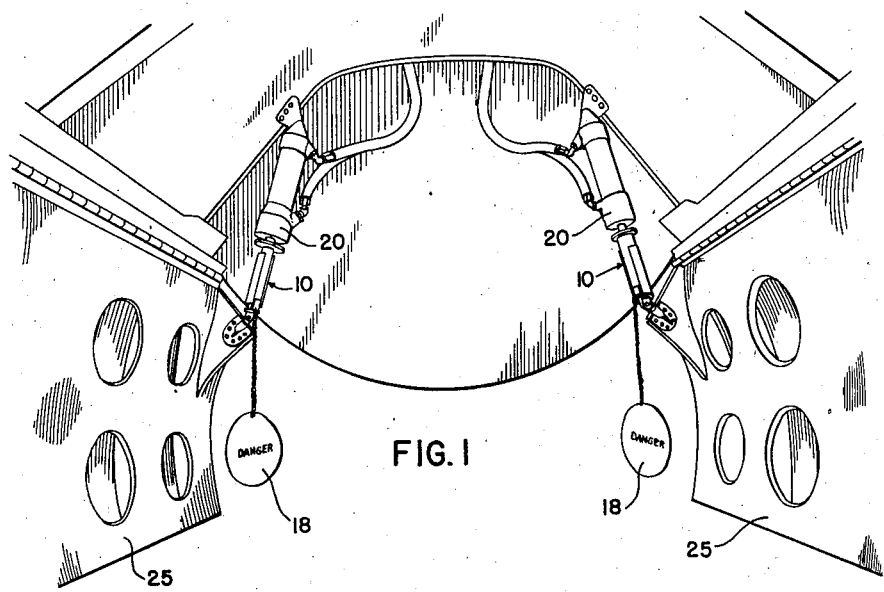
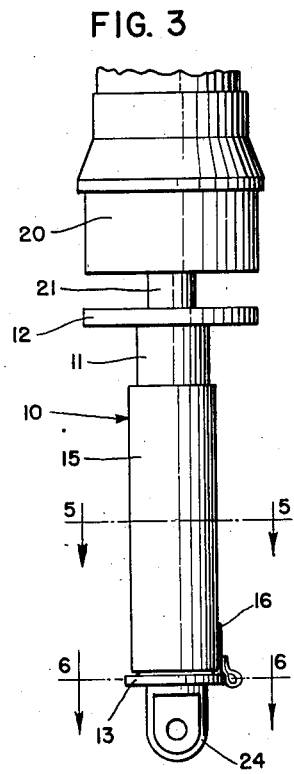
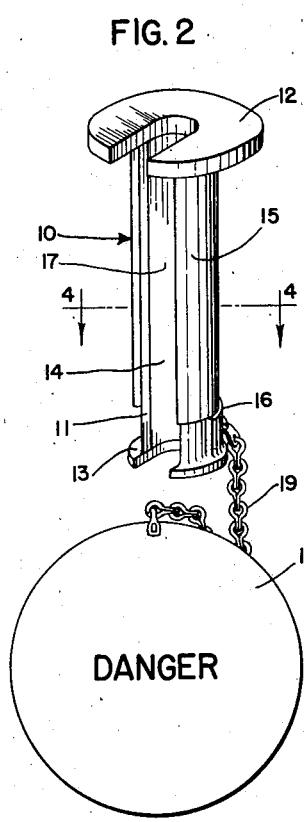
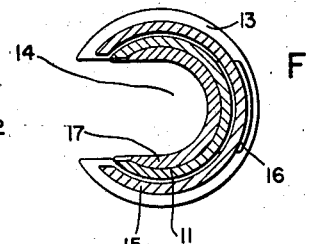
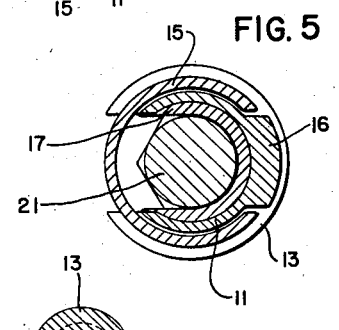
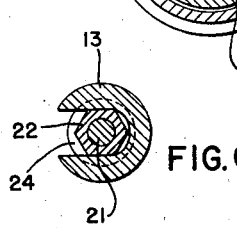
INVENTOR.
GEORGE E. STEWART
BY
ATTORNEY Patented Apr. 2, 1946

2,397,516

UNITED STATES PATENT OFFICE 2,397,516

SAFETY LOCKING DEVICE

George E. Stewart, Canal Winchester, Ohio, assignor to Curtiss-Wright Corporation, a corporation of Delaware Application August 5, 1944, Serial No. 548,246

1 Claim. (Cl. 188—67)

This invention relates to locking devices. More particularly, it relates to a safety locking device that is adapted to lock a piston rod in extended position with respect to the cylinder in which the piston operates.

The bomb bay doors of an airplane usually constitute the belly portion of the fuselage and are hinged at their outside edges to the fuselage and operate with a pincer movement. The hazard of bomb bay doors closing upon workmen in the bomb bay area is great. Many workmen have been seriously injured and fatalities might easily occur because of the accidental or inadvertent closing of the bomb bay doors while a workman is standing on the ground in the area of the bomb bay. In modern fighter-bomber airplanes the bomb bay area and doors are not visible from the cockpit of the pilot or bombardier. Therefore it cannot readily be determined from either of these cockpits whether or not the area is clear and whether it is safe to close the doors. Since the bomb bay doors are actuated by hydraulic devices that are connected into complicated hydraulic systems subject to great hydraulic pressures, there is also the possibility that some defect in the system might cause the door actuating mechanisms to be exposed to hydraulic pressure and to endanger a person who is in the bomb bay area. It is not uncommon that the devices that operate the doors develop door closing forces ranging up to a thousand pounds and greater.

It is therefore an object of this invention to provide a safety locking device to prevent the operation of hydraulically operated mechanisms. It is another object to provide such a device which will lock a hydraulic mechanism in one position and prevent its movement from that position until the locking device is removed. Other objects will appear hereinafter.

These objects are accomplished by means of a slotted tubular member provided at each of its ends with a slotted flange and having mounted thereon a rotatable slotted sleeve. A piston rod in its extended position is adapted to fit into the slotted portions, whereupon the sleeve may be rotated to close the slot on the tubular member.

In the drawing, Figure 1 is a perspective view of two locking devices according to the present invention installed in locked position on the hydraulic operating mechanism for opening and closing bomb bay doors in an airplane; Figure 2 is an enlarged perspective view of a locking device shown in Figure 1, in inoperative position; Figure 3 is an elevational view of a portion of the mechanism as shown in Figure 1; Figure 4 is a view taken along the line 4—4 of Figure 2; and Figures 5 and 6 are views taken along the lines 5—5 and 6—6, respectively, of Figure 3.

Referring now to the drawing, there is shown a preferred form of the locking device of this invention. The body of the device 10 consists of a tubular member 11 that has attached at its end a pair of slotted flanges 12 and 13. The body may be attached to these flanges in any suitable manner, such as by brazing or welding, or the flanges may be formed integral with the body. The tube 11 is provided with a slot 14 throughout its length and is assembled with the flanges so that the slots in the flanges and member 11 are in alignment. This permits the locking device to be placed over a piston rod so that when the device is in position on the rod the rod will occupy the center of the tubular member 11. A slotted sleeve 15 fits over the tubular member 11 and is rotatable thereon so that, when the member 15 is rotated to one position, the slots in the tubular member and the sleeve coincide, while rotation to another position causes the slot in the tubular member 11 to become enclosed. The length of the sleeve 15 is less than that of the tubular member 11, so that the sleeve may be reciprocated on tubular member 11.

Reciprocation is prevented, however, by means of a projection 16 on the tubular member 11 (see Figure 2). This projection is of a width equal to or less than the width of the slot in the sleeve 15, so that, upon rotation of the sleeve until the slot and projection 16 are in alignment, the sleeve will slide down over the projection. In this position the sleeve is locked against rotational movement until it is again moved upwardly to clear the projection 16.

The size and outside contour of the flanges 12 and 13 may be varied to fit the mechanism upon which the locking device is to be used. The locking device is shown in the drawing as having flanges adapted for use with the cylinder 20 and piston rod 21 of a hydraulic mechanism that operates a bomb bay door of a modern fighter-bomber airplane. The flange 12 in this embodiment is of such diameter as to engage a face of the hydraulic cylinder 20. The flange 13 is of smaller diameter and is of such a size that a lock nut 22 threaded on piston rod 21 will snugly fit therein. Flange 13 abuts against an enlarged end 24 of the piston rod. Preferably surfaces of the flanges that engage the piston rod are smooth and free of burrs and the like to prevent damage to the cylinder and piston rod.

During use and because of rough handling of the locking devices the edges of the flanges are sometimes damaged in such a manner as to form burrs and protruding portions on the edges of the flanges that surround the rod. These burrs and protuberances cause damage to the piston rod both during and after the installation of the locking device on the rod. In the preferred embodiment of the invention the edges of the locking device are prevented from touching the piston rod by means of a plastic liner 17 molded into the slot 14. The thickness of the liner is such that it surrounds and engages the piston rod and keeps the flanges of the locking device out of contact with the piston rod.

The locking device 10 is shown mounted on a piston rod of a hydraulic operating cylinder 20 for a hinged bomb-bay door 25 of an airplane and locking the piston rod in an extended position relative to cylinder 20. Each locking device is provided with a pendant means 18 which is preferably attached to flange 13 by a chain 19. The word "danger" is printed on the pendant as a warning to a pilot that it is impossible for him to close the bomb-bay doors of the airplane and to indicate the presence of the lock to a workman who is about to enter the danger zone.

In use, the bomb bay doors are opened to their fullest extent to expose the hydraulically operated piston rod. A locking device is operated to lock the rod in this extended position by rotating the outer member 15 until the slot 14 coincides with the slot in the sleeve 15. The device is then placed over the rod 21, so that the flange 12 abuts the cylinder 20 and the flange 13 engages the stop means 24 on the piston rod. The sleeve 15 is now rotated to close the slot 14 and is interlocked with the projection 16 on the member 11 by sliding the sleeve 15 endwise until projection 16 extends into the slot on the sleeve 15. Preferably a locking device is placed on each of the door actuating struts in order that the doors will not be sprung by the action of the hydraulic devices should they accidentally be put into operation. When the locking devices 10 are in position on the hydraulic actuating devices, the pendants 18 hang downwardly so that a workman or a pilot entering the airplanes will be apprised of their presence and so that the workman will know that he will not be endangered if he enters the bomb-bay area and the pilot will not attempt to fly the airplane.

From the foregoing it will be noted that there has been provided a simple and efficient safety lock for actuating mechanisms such as cooperating hydraulic cylinders and piston rods that can be readily and economically manufactured and that are easily used without damage to the actuating mechanism. Although the invention has been specifically described with reference to hydraulic actuating cylinders and pistons for bomb bay doors, it is understood that it is equally applicable to other hydraulic mechanisms and hydraulic actuating mechanism.

The above discussion has been in connection with a specific form of the invention. It is obvious, however, that many changes may be made in this form without departing from the spirit of the invention. It is to be understood, therefore, that the invention is not to be limited except as defined in the appended claim.

I claim:

A locking means adapted to maintain a piston rod in an extended position with respect to its cylinder, comprising a tubular member, a longitudinal slot extending the length of said tubular member, a pair of flanges at the opposite ends of said tubular member, slots in said flanges in alignment with the slot in said tubular member, a sleeve surrounding said tubular member and rotatable and slidable thereon, a longitudinal slot in said sleeve in alignment with the slot in said tubular member in one position of said sleeve and out of alignment with the slot in said tubular member in another position of said sleeve, whereby the slot in said tubular member will be enclosed for at least a portion of its length in said last-named position of said sleeve, and a projection on said tubular member positioned in the slot of said sleeve upon slidable movement of said sleeve in said last-named position of said sleeve to lock said sleeve against rotation.

GEORGE E. STEWART.